US010994241B1

(12) United States Patent
Junaedi et al.

(10) Patent No.: US 10,994,241 B1
(45) Date of Patent: May 4, 2021

(54) SORBENT SYSTEM FOR REMOVING AMMONIA AND ORGANIC COMPOUNDS FROM A GASEOUS ENVIRONMENT

(71) Applicant: Precision Combustion, Inc., North Haven, CT (US)

(72) Inventors: Christian Junaedi, Cheshire, CT (US); Codruta Maria Zoican-Loebick, North Haven, CT (US); Kyle Hawley, Woodbury, CT (US)

(73) Assignee: Precision Combustion, Inc., North Haven, CT (US)

( * ) Notice: Subject to any disclaimer, the term of this patent is extended or adjusted under 35 U.S.C. 154(b) by 218 days.

(21) Appl. No.: 16/008,115

(22) Filed: Jun. 14, 2018

Related U.S. Application Data

(60) Provisional application No. 62/530,327, filed on Jul. 10, 2017.

(51) Int. Cl.

| | | |
|---|---|---|
| *B01D 53/04* | (2006.01) | |
| *B01J 20/20* | (2006.01) | |
| *B01D 53/047* | (2006.01) | |
| *B01J 20/04* | (2006.01) | |
| *B01J 20/06* | (2006.01) | |
| *B01J 20/02* | (2006.01) | |
| *B01J 20/28* | (2006.01) | |
| *B01J 20/32* | (2006.01) | |
| *B01J 20/34* | (2006.01) | |

(52) U.S. Cl.
CPC ...... *B01D 53/0476* (2013.01); *B01J 20/0229* (2013.01); *B01J 20/0237* (2013.01); *B01J 20/0244* (2013.01); *B01J 20/041* (2013.01); *B01J 20/046* (2013.01); *B01J 20/06* (2013.01); *B01J 20/20* (2013.01); *B01J 20/28059* (2013.01); *B01J 20/28061* (2013.01); *B01J 20/28064* (2013.01); *B01J 20/28076* (2013.01); *B01J 20/3206* (2013.01); *B01J 20/3458* (2013.01); *B01J 20/3491* (2013.01); *B01D 2253/102* (2013.01); *B01D 2253/1122* (2013.01); *B01D 2253/1124* (2013.01); *B01D 2253/306* (2013.01); *B01D 2253/311* (2013.01); *B01D 2257/406* (2013.01); *B01D 2257/708* (2013.01)

(58) Field of Classification Search
CPC .. B01D 53/04; B01D 53/0476; B01D 53/047; B01D 2253/102; B01D 2253/1122; B01D 2253/1124; B01D 2253/306; B01D 2253/311; B01D 2257/406; B01D 2257/708; B01J 20/0229; B01J 20/0237; B01J 20/0244; B01J 20/041; B01J 20/046; B01J 20/06; B01J 20/20; B01J 20/28059; B01J 20/28061; B01J 20/28064; B01J 20/28076; B01J 20/3206; B01J 20/3458; B01J 20/3491

USPC ............... 95/96, 128, 141, 148; 96/153, 154
See application file for complete search history.

(56) References Cited

U.S. PATENT DOCUMENTS

| | | | |
|---|---|---|---|
| 5,051,241 A | 9/1991 | Pfefferle | |
| 6,156,444 A | 12/2000 | Smith | |
| 6,187,823 B1 | 2/2001 | Haddon | |
| 6,328,936 B1 | 12/2001 | Roychoudhury | |
| 6,596,909 B2 | 7/2003 | Nishijima | |
| 7,141,092 B1 | 11/2006 | Roychoudhury | |
| 9,156,701 B2 | 10/2015 | Ho | |
| 9,200,804 B2 | 12/2015 | Park | |
| 10,107,706 B2 | 7/2018 | Zoican-Loebick | |
| 10,464,044 B1* | 11/2019 | Zoican-Loebick | ...... B01J 20/22 |
| 10,668,447 B2* | 6/2020 | Zoican-Loebick | .... B01D 53/72 |
| 2003/0024884 A1 | 2/2003 | Petrik | |
| 2006/0191835 A1 | 8/2006 | Petrik | |
| 2011/0217217 A1* | 9/2011 | Bandosz | ................ B01D 53/40 423/226 |
| 2013/0105400 A1* | 5/2013 | Lee | ........................ B01J 20/205 210/688 |

(Continued)

FOREIGN PATENT DOCUMENTS

| | | |
|---|---|---|
| CN | 105129772 A | 12/2015 |
| WO | WO2015184816 A1 | 12/2015 |

OTHER PUBLICATIONS

Yungue Li et al, "Metal-decorated graphene oxide for ammonia adsorption" 2013 EPL 103 28007.*
Yue Peng et al, "Ammonia adsorption on graphene and graphene oxide: a first-principles study" Front. Environ. Sci. Eng. 2013 7(3): 403-411.*

(Continued)

*Primary Examiner* — Frank M Lawrence, Jr.
(74) *Attorney, Agent, or Firm* — Marie F. Zuckerman; Andrew D. Gathy

(57) ABSTRACT

A first process and sorbent for removing ammonia from a gaseous environment, the sorbent comprised of graphene oxide having supported thereon at least one compound selected from metal salts, metal oxides and acids, each of which is capable of adsorbing ammonia. A second process and sorbent system for removing ammonia and a volatile organic compound from a gaseous environment; the sorbent system comprised of two graphene-based materials: (a) the aforementioned graphene oxide, and (b) a nitrogen and oxygen-functionalized graphene. The sorbents are regenerable under a pressure gradient with little or no application of heat. The processes are operable through multiple adsorption-desorption cycles and are applicable to purifying and revitalizing air contaminated with ammonia and organic compounds as may be found in spacesuits, aerospace cabins, underwater vehicles, and other confined-entry environments.

19 Claims, 3 Drawing Sheets

(56) References Cited

U.S. PATENT DOCUMENTS

| | | | | |
|---|---|---|---|---|
| 2014/0011034 A1* | 1/2014 | Majumder | ............ | C09K 8/805 |
| | | | | 428/406 |
| 2017/0369333 A1* | 12/2017 | Heidarizad | ............ | B01J 20/205 |
| 2018/0319677 A1* | 11/2018 | Perreault | ................. | B01J 20/20 |

OTHER PUBLICATIONS

Co-pending unpublished U.S. Appl. No. 15/582,813, filed May 1, 2017, entitled "High Capacity Regenerable Graphene-Based Sorbent"; Inventor: Codruta Maria Zoican-Loebick.

Marek A. Wojtowicz, Joseph E. Cosgrove, Michael a. Serio and Monique S. Wilburn, "Co-adsorption of Ammonia and Formaldehyde on Regenerable Carbon Supports for the Primary Life Support System (PLSS)", ICES-2016-345; 46th International Conference on Environmental Systems, Vienna, Austria, Jul. 10-14, 2016.

Marek A. Wojtowicz, Joseph E. Cosgrove, Michael A. Serio and Monique S. Wilbum, " Adsorption of Ammonia on Regenerable Carbon Supports", ICES-2015-179; 45th International Conference on Environmental Systems, Bellevue, Washington, Jul. 12-16, 2015.

Marek A. Wojtowicz, Joseph E. Cosgrove, Michael A. Serio and Mallory A. Jennings, "Reversible Ammonia Sorption on carbon for the Primary Life Support System (PLSS)", AIAA 2012-3437, 42nd International Conference on Environmental Systems, San Diego, California, Jul. 15-19, 2012.

Rafal Sitko, Beata Zawisza, and Ewa Malicka,"Graphene as a new sorbent in analytical chemistry", Trends in Analytical Chemistry, 51 (2013), pp. 33-43.

Shivani Choudhary, Hershel P. Mungse, and Om P. Khatri, "Dispersion of alkylated graphene in organic solvents and its potential for lubrication applications", J. Mater. Chem., 22 (2012), pp. 21032-21039.

M.M. Tokarev, J.V. Veselovskaya, H. Yanagi, Yu.l. Aristov, "Novel ammonia sorbents "porous matrix modified by active salt" for adsorptive heat transformation: 2. Calcium chloride in ACF felt", Applied Thermal Engineering, 30 (2010), 845-849.

Bernadette Luna, Ph.D., George Somi, J. Parker Winchester, Jeffrey Grose, Lila Mulloth, and Jay L. Perry, "Evaluation of Commercial Off-the-Shelf Sorbents and Catalysts for Control of Ammonia and Carbon Monoxide", AIAA 2010-6062, 40th International Conference on Environmental Systems, Barcelona, Spain, Jul. 11-15, 2010.

H.C. Schniepp, et al., "Functionalized Single Graphene Sheets Derived from Splitting Graphene Oxide," The Journal of Physical Chemistry B, Letters, vol. 110 (2006), pp. 8535-8539.

S. Roychoudhury, D. Walsh, and J. Perry, "Microlith-Based Sorber for Removal of Environmental Contaminants," SAE Technical Paper 2004-01-2442, SAE International (2004).

\* cited by examiner

SORBENT SYSTEM FOR REMOVING AMMONIA AND ORGANIC COMPOUNDS FROM A GASEOUS ENVIRONMENT

CROSS-REFERENCE TO RELATED APPLICATION

This application claims the benefit of U.S. Provisional Patent Application No. 62/530,327, filed Jul. 10, 2017, and incorporated in its entirety herein by reference.

GOVERNMENT RIGHTS

This invention was made with support from the U.S. Government under Contract No. NNX16CJ41P, awarded by the National Aeronautics and Space Administration. The Government has certain rights in this invention.

FIELD OF THE INVENTION

In one aspect, this invention pertains to a first process and sorbent for removing ammonia from a gaseous environment. In another aspect, this invention pertains to a second process and sorbent system for removing ammonia and a volatile organic compound (VOC), such as formaldehyde, from a gaseous environment. The aforementioned processes employ one or more graphene-based sorbents.

BACKGROUND OF THE INVENTION

Trace contaminants introduced into a ventilation loop of an enclosed or entry-limited environment, such as a spacesuit or a vehicular cabin, are typically removed via sorption with activated carbon. Such trace contaminants predominantly include ammonia and formaldehyde. Both ammonia and formaldehyde as well as other contaminants are produced via metabolic processes, or off-gassing of construction and spacesuit materials, or are produced as by-products of an amine used in carbon dioxide sorbent systems, such as, the Rapid Cycle Amine (RCA) system developed by United Technologies Corporation as sponsored by NASA. Based on studies performed by NASA, a Trace Contaminant Control (TCC) device is required in a ventilation loop of a Portable Life Support System (PLSS) of a spacesuit in order to control ammonia and formaldehyde from exceeding their Spacecraft Maximum Allowable Concentration (SMAC) levels. On a larger scale, ammonia occurs as a waste gas in industrial processes and in animal husbandry environments, the latter exemplified by the poultry industry. In industrial processes, scrubbers comprising activated carbon typically are used for ammonia removal. In animal husbandry, ventilation with outside air is employed requiring expensive conditioning via heating or cooling.

Although activated carbon is effective as a sorbent for ammonia and VOC's, activated carbon comes with well-recognized disadvantages. Activated carbon provides a bulky, weighty sorbent system. Moreover, a sorbent bed comprising powdered activated carbon has a high pressure drop that is subject to channeling and non-uniform flow distribution. In addition, activated carbon suffers from low regeneration capability and unacceptable power consumption. Specifically, activated carbon sorbents require an elevated temperature with extended power consumption for thermal regeneration. More disadvantageously, the activated carbon sorbent of NASA's spacesuit TCC system cannot be regenerated during an Extravehicular Activity (EVA) mission where the elevated temperature is unavailable. EVA regeneration is also prohibited for its unacceptable power consumption as well as its flammability hazard on the mission's essentially pure oxygen environment.

In the way of further disadvantages, where the sorbent must remove multiple contaminants from the same gaseous environment, activated carbon suffers from competitive adsorption wherein more strongly adsorbed compounds replace and outgas weakly adsorbed compounds. During thermal regeneration, activated carbon is also prone to loss of sorbent capacity and mass through oxidation and attrition, respectively. Thermal regeneration of activated carbon also poses a fire hazard. Lastly, a sorbent based on activated carbon relies on a consumable, which means the activated carbon requires replacement at the end of its life cycle. In view of the above, life cycle operating costs of employing activated carbon as a sorbent remain unacceptable for regenerative contaminant control.

Molecular sieves and zeolites are known sorbents and well researched into related effects of pellet size and shape, humidity level, and flow rate on regenerative contaminant control. Pelletized sorbents like molecular sieves, zeolites, and even activated carbon, exhibit an adsorption capacity limited by diffusion of sorbate into the pellet core, thereby restricting access to available adsorption capacity. Pellets also suffer from too high a pressure drop and flow channeling. Sorbent coatings on monolithic supports offer high geometric surface area per unit volume and reduced pressure drop, but they are limited by loading capacity. Sorbents based on molecular sieves and zeolites also require thermal-assisted regeneration, that is, an addition of heat to be fully regenerated, which as noted earlier is unfeasible either for its unacceptable power consumption or its lack of availability, or both. Moreover, zeolites and molecular sieves have reduced cyclic capacity when operating under vacuum swing regeneration and when exposed to humid air.

The art would benefit from discovery of an improved process and sorbent for removing contaminants from a gaseous environment, more particularly, for removing trace contaminants from a gaseous environment, most notably, for removing ammonia and optionally a volatile organic compound, such as formaldehyde, from a gaseous environment. Such a sorbent should desirably provide improved sorbent capacity towards the contaminants of interest as well as good thermal and attrition resistance. Desirably, the sorbent should be capable of regeneration at a temperature less than about 40° C. so as to minimize power consumption. Even more desirably, the sorbent should offer lighter weight, smaller volume, lower pressure drop, a uniform flow distribution essentially without channeling, and a lower reliance on consumables, as compared with present day sorbents.

SUMMARY OF THE INVENTION

In a first aspect, this invention provides for a novel sorbent composition comprising graphene oxide having supported thereon at least one compound selected from metal salts, metal oxides, and acids, each of which is capable of reversibly adsorbing ammonia.

In a related first aspect, this invention provides for a novel process of removing ammonia from a gaseous environment, comprising contacting a gaseous feedstream comprising an initial concentration of ammonia with a sorbent under conditions sufficient to produce an effluent stream comprising a reduced concentration of ammonia as compared with the initial concentration. In this related first aspect, the sorbent comprises the graphene oxide having supported thereon at least one compound selected from metal salts, metal oxides, and acids, each of which is capable of reversibly adsorbing ammonia.

In these aforementioned first aspects, we have discovered a novel sorbent useful for removing ammonia from any gaseous environment comprising ammonia as a contaminant or undesirable component including, without limitation, gaseous environments wherein ammonia occurs in increasingly unacceptable concentrations as a byproduct of metabolic processes or outgassing of materials, or as a result of amine sorption of carbon dioxide, or as a waste product of an industrial process or a waste product in an animal husbandry environment. As the sorbent, our process employs a high surface area nanomaterial, specifically, graphene oxide having supported thereon one or more compounds selected from metal salts, metal oxides and acids, which each one and all are capable of reversibly adsorbing ammonia. As used herein and throughout this description, the term "reversibly adsorbing" generally means that a sorbent is capable of binding to its surface a sorbate, such as ammonia or a volatile organic compound depending upon the selected sorbent, up to a saturation or partial saturation level thereby removing the sorbate from a gaseous environment; and thereafter the saturated or partially saturated sorbent is capable of releasing the bound sorbate under regeneration conditions so as to produce the sorbent with regenerated sorbent capacity.

In a second aspect, this invention pertains to a sorbent system comprising the following components:
  (a) a graphene oxide having supported thereon at least one compound selected from metal salts, metal oxides, and acids, each of which is capable of reversibly adsorbing ammonia; and
  (b) a nitrogen and oxygen-functionalized graphene prepared by a process comprising, contacting graphene oxide with an amine of the formula $NHR_2$, wherein each R is independently selected from the group consisting of hydrogen, $C_{1-7}$ alkyl, and $C_{1-7}$ aminoalkyl, the contacting occurring under reaction conditions sufficient to produce the nitrogen- and oxygen-functionalized graphene.

In a related second aspect, this invention provides for a novel process of removing a plurality of contaminants including ammonia and a volatile organic compound from a gaseous feedstream. The novel process of this invention comprises contacting a gaseous feedstream comprising an initial concentration of ammonia and an initial concentration of a volatile organic compound with a sorbent system under conditions sufficient to produce an effluent stream comprising reduced concentrations of ammonia and the volatile organic compound as compared with their respective initial concentrations. In this related second aspect, the sorbent system comprises the following components:
  (a) a graphene oxide having supported thereon at least one compound selected from metal salts, metal oxides, and acids, each of which is capable of reversibly adsorbing ammonia; and
  (b) a nitrogen and oxygen-functionalized graphene prepared by a process comprising, contacting graphene oxide with an amine of the formula $NHR_2$, wherein each R is independently selected from the group consisting of hydrogen, $C_{1-7}$ alkyl, and $C_{1-7}$ aminoalkyl, the contacting occurring under reaction conditions sufficient to produce the nitrogen- and oxygen-functionalized graphene.

In these second aspects of this invention, the process employs a novel sorbent system comprising two graphene-based nano materials, one characterized by a high surface area and sorbent capacity for ammonia, and the other characterized by a high surface area and sorbent capacity for volatile organic compounds. This novel sorbent system beneficially exhibits improved regenerability at a temperature less than 40° C., resulting over time in reduced power consumption, preserved sorbent capacities, less thermal degradation, less attrition, and improved life cycle of the individual sorbents. In a preferred embodiment, the sorbent system of this invention is supported on a mesh support, which provides for lower weight and lower volume, a reduced pressure drop, and improved uniformity of flow distribution as compared to other support systems, such as pellets, as well as a lessened reliance on consumables as compared with activated carbon.

The graphene-based sorbents of this invention advantageously exhibit an excellent degree of regenerability after the sorbent is saturated or partially saturated with contaminant(s). Regeneration is easily accomplished by flushing the saturated or partially saturated sorbent with dry uncontaminated air or, alternatively, by pressure (vacuum) swing regeneration with little or no application of heat. By eliminating elevated temperatures, the regeneration procedures of this invention advantageously result in a safer process with power savings. Moreover, sorbent regeneration as provided by this invention can be performed during EVA missions.

Tests performed at higher humidity, for example, 40 percent or higher relative humidity, on the graphene-based sorbents of this invention showed little effect of water on the retention capacities for ammonia and the volatile organic compound, which provides another beneficial feature allowing for flexibility in operation. As a further advantage, the sorbents of this invention exhibit little, if any, effect in performance on exposure to carbon dioxide, a ubiquitous component in enclosed spacesuit or cabin environments as well as in waste combustion streams. The graphene sorbents of this invention provide superior performance due to their relatively high surface area and specific chemistry, with added potential for low manufacturing costs in large-scale.

One utility for the processes and sorbent compositions of this invention involves removing two significant trace contaminants, namely ammonia and formaldehyde, from the gaseous environment circulating through spacesuits, such as in NASA's TCC system attached to its Portable Life Support System. Other utilities for the processes and sorbent compositions of this invention include air revitalization and purification in passenger aircraft, atmosphere revitalization in underwater vehicles, air purification in ground crew cabins and ground vehicles, as well as cleaning indoor air in enclosed or confined-entry systems. Our sorbents are also envisioned to be adaptable to present day heating, ventilation, and air conditioning systems (HVAC systems) in conjunction with existing particle filters to directly clean indoor air while decreasing a requirement for costly outside air ventilation. Currently, about 20 to 40 percent of energy consumed in U.S. commercial and residential buildings is used for HVAC. In another embodiment, the processes and sorbent compositions of this invention are employable in purifying air in stand-alone room purification units, for example, as a drop-in replacement for activated carbon. Another utility for the processes and compositions of this invention involves scrubbing waste gas streams from industrial processes as well as from animal husbandry environments, poultry farms exemplifying an important application. This application envisions drop-replacing conventional activated carbon scrubbers with the novel sorbent(s) of this invention for increased sorbent capacity and sorbent lifetime.

DRAWINGS

DETAILED DESCRIPTION OF THE INVENTION

Figure 1:
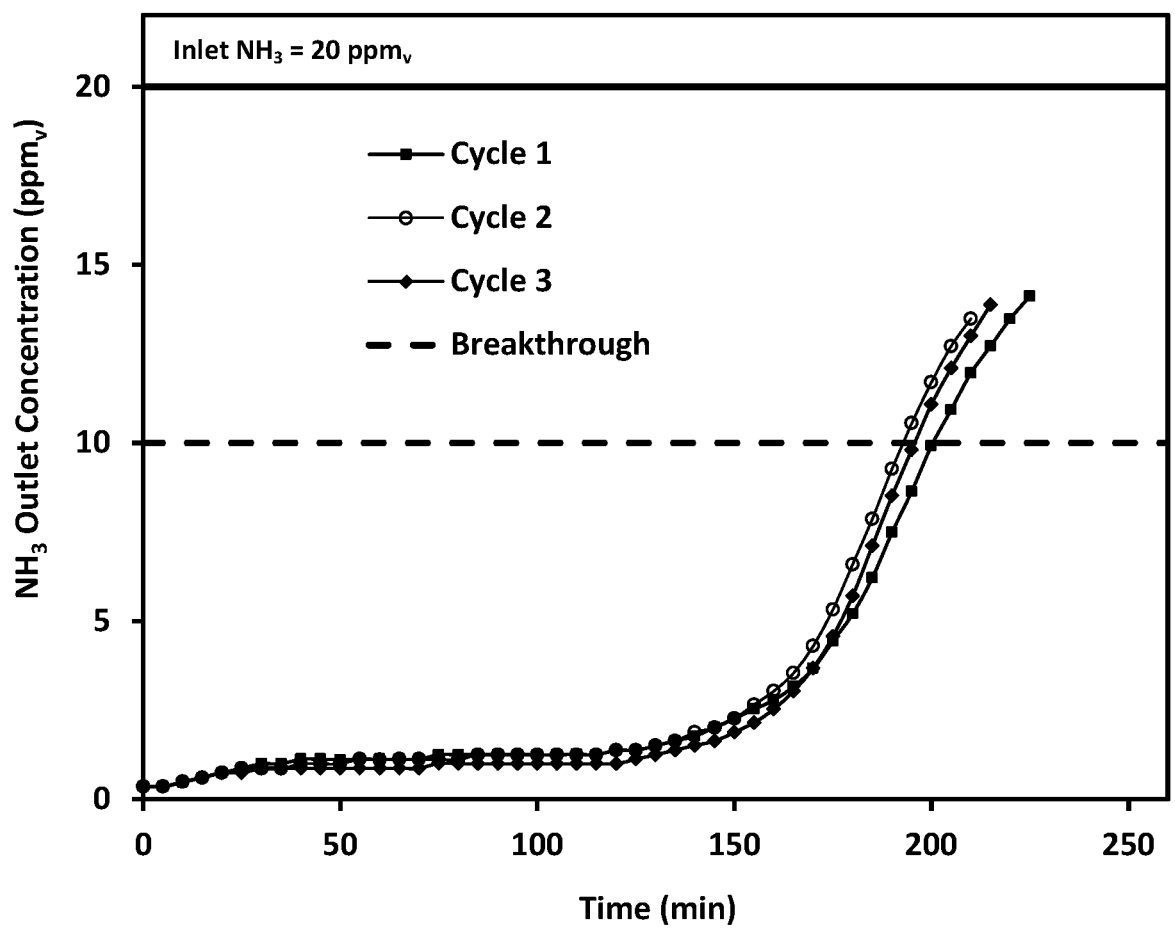
FIG. 1 depicts a graph plotting ammonia outlet concentration as a function of time in an embodiment of this invention in which ammonia is removed from a gaseous feedstream using the ammonia sorbent in powder form.

In one exemplary embodiment of this invention, there is provided a novel sorbent composition comprising graphene oxide having supported thereon at least one compound selected from metal salts, metal oxides, and acids, each of which is capable of reversibly adsorbing ammonia, wherein said graphene oxide is itself supported on a mesh support having an ultra-short-channel-length.

In another exemplary embodiment of this invention, there is provided a novel process of removing ammonia from a gaseous environment, comprising contacting a gaseous feedstream comprising an initial concentration of ammonia with a sorbent under conditions sufficient to produce an effluent stream comprising a reduced concentration of ammonia as compared with the initial concentration. In this exemplary embodiment, the sorbent comprises the aforementioned graphene oxide having supported thereon at least one compound selected from metal salts, metal oxides, and acids, each of which is capable of reversibly adsorbing ammonia, wherein said graphene oxide is itself supported on a mesh support having an ultra-short-channel-length.

In another exemplary embodiment of this invention, there is provided a novel sorbent system comprising the following components:
(a) a graphene oxide having supported thereon at least one compound selected from metal salts, metal oxides, and acids, each of which is capable of reversibly adsorbing ammonia; and
(b) a nitrogen and oxygen-functionalized graphene prepared by a process comprising, contacting graphene oxide with an amine of the formula $NHR_2$, wherein each R is independently selected from the group consisting of hydrogen, $C_{1-7}$ alkyl, and $C_{1-7}$ aminoalkyl, the contacting occurring under reaction conditions sufficient to produce the nitrogen- and oxygen-functionalized graphene;
wherein said graphene oxide and said functionalized graphene are each supported on a mesh support having an ultra-short-channel-length.

In yet another exemplary embodiment of this invention, there is provided a novel process of removing ammonia and a volatile organic compound from a gaseous environment, comprising contacting a gaseous feedstream comprising an initial concentration of ammonia and an initial concentration of a volatile organic compound with a sorbent system under conditions sufficient to produce an effluent stream comprising reduced concentrations of ammonia and the volatile organic compound as compared with their respective initial concentrations; wherein the sorbent system comprises the following components:
(a) a graphene oxide having supported thereon at least one compound selected from metal salts, metal oxides, and acids, each of which is capable of reversibly adsorbing ammonia; and
(b) a nitrogen and oxygen-functionalized graphene prepared by a process comprising, contacting graphene oxide with an amine of the formula $NHR_2$, wherein each R is independently selected from the group consisting of hydrogen, $C_{1-7}$ alkyl, and $C_{1-7}$ aminoalkyl, the contacting occurring under reaction conditions sufficient to produce the nitrogen- and oxygen-functionalized graphene;
wherein said graphene oxide and said functionalized graphene are each supported on a mesh support having an ultra-short-channel-length.

The gaseous environment from which the gaseous feedstream is derived encompasses any gaseous mixture comprising ammonia ($NH_3$) and at least one other gaseous component preferably selected from nitrogen, oxygen, air, carbon monoxide, carbon dioxide, water, and mixtures thereof. In one embodiment, the gaseous feedstream additionally comprises at least one volatile organic compound (VOC), which include any compound comprising at least carbon and hydrogen atoms and having a measureable vapor pressure. The concentrations of ammonia and any VOC in the gaseous feedstream depend upon the source of the gaseous environment and each component's partial pressure therein. Generally, ammonia and any VOC present in the feedstream are each independently present in a concentration ranging from several parts per billion by volume ($ppb_v$) to many thousands of parts per million by volume ($ppm_v$). In one embodiment, ammonia is present as a contaminant in the feedstream in a concentration ranging from greater than about 0.1 $ppm_v$ (100 $ppb_v$) to less than about 10,000 $ppm_v$. In another embodiment, ammonia is present in the feedstream in a concentration ranging from about 10 $ppm_v$ to about 100 $ppm_v$. It is noted that the permissible SMAC of ammonia during an EVA mission is only 20 $ppm_v$. In another embodiment, each VOC, if present, is present as a contaminant in the feedstream in a concentration ranging from about 0.1 $ppm_v$ to about 10,000 $ppm_v$. In another embodiment, formaldehyde, if present, is present as a contaminant in the feedstream in a concentration ranging from about 0.1 $ppm_v$ to about 10 $ppm_v$. It is noted that the permissible SMAC of formaldehyde during an EVA mission is only 0.5 $ppm_v$.

The volatile organic compound may be classified as either polar or non-polar. For purposes of this invention, the term "polar" refers to a chemical compound having a dipole moment of at least about 0.8 Debye ($\geq 0.8$ D); whereas the term "non-polar" refers to a chemical compound having a weak dipole moment or no dipole moment, specifically, a dipole moment less than 0.8 D including as low as 0 D. As known in the art, dipole moment is a measure of electrical polarity of a system of electrical charges. Atoms that provide a dipole moment to a volatile organic compound include, but are not limited to, oxygen, nitrogen, halogen, and sulfur. Suitable non-limiting examples of oxygen-containing substituents that impart a dipole moment to the VOC include hydroxyl, epoxy, acyl, keto, and carboxyl. Suitable non-limiting examples of nitrogen-containing substituents that impart a dipole moment include amine and amide. Suitable non-limiting examples of halogen-containing substituents that impart a dipole moment include fluorine, chlorine, bromine, and iodine; and suitable non-limiting examples of sulfur-containing substituents that impart a dipole moment include thiol, sulfite, sulfate, and thionyl. Purely organic substituents consisting of hydrogen and carbon atoms can also provide a dipole moment to the volatile organic compound depending upon position(s) and number of organic substituent(s), such organic substituents including but not limited to methyl, ethyl, propyl, and higher homologues thereof.

In one exemplary embodiment, the volatile organic compound is a polar compound having a dipole moment of at least about 1.5 D. In another exemplary embodiment, the volatile organic compound is a polar compound having a dipole moment of at least about 2.0 D. In yet another exemplary embodiment, the volatile organic compound is a polar compound having a dipole moment of at least about 2.5 D. At the upper limit the polar VOC typically has a dipole moment less than about 15 D.

The volatile organic compound in one exemplary embodiment comprises an odoriferous compound or an irritant, for example, an irritant towards skin and/or eyes. In another embodiment the volatile organic compound comprises a pollutant or contaminant, which we define as a chemical compound that is classified as noxious, hazardous or otherwise harmful to humans in a concentration greater than an established threshold level. Reference is made herein to the "Toxic and Hazardous Substances" List, Table Z-1, of the Occupational Safety and Health Standards, distributed by the Occupational Safety and Health Administration (OSHA), where the skilled person finds a list of contaminants and pollutants, many of them classifying as polar VOC's, along with their maximum allowable concentration in air. Reference is also made to the "Priority Pollutant List" distributed by the Environmental Protection Agency of the United States, wherein over 126 pollutants are identified. Among these lists are found various non-limiting examples of VOC's including acetaldehyde, acetic acid, acetone, acetonitrile, acrolein, acrylamide, acrylonitrile, allyl alcohol, allyl chloride, aminoethanol, aniline, benzyl chloride, butane thiol, butyl alcohol, butyl amine, chloroacetaldehyde, chlorobenzene, chloroform, cyclohexanol, dichlorobenzene, dichloromethane, dimethylamine, dihydroxymethane, dioxane, ethanol, ethanethiol, ethyl acetate, ethylamine, formaldehyde, formic acid, furan, methanol, methyl mercaptan, methyl acetate, methyl acrylate, methyl bromide, methyl ethyl ketone, phenol, propylene oxide, tetrahydrofuran, and vinyl chloride. It should be appreciated that certain VOC's may be classified into several of the aforementioned categories; for example, an odoriferous VOC or irritant may also be classified as a pollutant or hazardous material. Additionally, it should be appreciated that in another embodiment the gaseous feedstream comprises a mixture of such VOC's.

In another exemplary embodiment the volatile organic compound is selected from the group consisting of $C_{1-8}$ oxy-substituted hydrocarbons and $C_{1-8}$ halocarbons and mixtures thereof. Preferred non-limiting examples of $C_{1-8}$ oxy-substituted hydrocarbons include $C_{1-8}$ aldehydes, ketones, epoxides, alcohols, carboxylic acids, and mixtures of the aforementioned compounds having from 1 to 8 carbon atoms. In another preferred embodiment, the volatile organic compound is a $C_{1-8}$ aldehyde or a mixture of $C_{1-8}$ aldehydes, illustrative species of which include formaldehyde, propionaldehyde, and butyraldehyde. In yet another preferred embodiment, the volatile organic compound is formaldehyde. Suitable non-limiting examples of $C_{1-8}$ halocarbons include $C_{1-8}$ chlorocarbons, such as carbon tetrachloride, $C_{1-8}$ hydrochlorocarbons, such as methylene dichloride, and $C_{1-8}$ fluorochlorocarbons, such as fluorotrichloromethane.

In addition to ammonia and any VOC, the gaseous feedstream comprises one or more other gases, these including chemical compounds that are not harmful to humans and chemical compounds that may be harmful but do not qualify as a VOC. In one embodiment, the other gases in the feedstream include at least one naturally occurring gas including but not limited to molecular oxygen, nitrogen, water, carbon dioxide, noble gases (helium, neon, argon, krypton, xenon), or any mixture thereof as found, for example, in air. In another embodiment, the other gases in the feedstream include waste gases produced by combustion, which comprise water, carbon monoxide, carbon dioxide, or any mixture thereof.

The relative humidity of the gaseous feedstream fed to the processes of this invention ranges from 0 percent to less than about 80 percent. "Relative humidity", expressed as a percentage, refers to an amount of water vapor present in the feedstream at a given temperature and pressure as compared with a maximum amount of water vapor that the feedstream can hold at the same temperature and pressure, i.e., the saturation amount. In one preferred embodiment, the relative humidity of the gaseous feedstream ranges from about 0 percent to about 40 percent.

We have discovered that the graphene-based sorbents of this invention are essentially non-responsive to carbon dioxide and further that carbon dioxide has essentially no adverse effects on these sorbents. Accordingly, the gaseous feedstream in one embodiment comprises any concentration of carbon dioxide less than 100 volume percent. Consequently, the sorbents of this invention beneficially provide for full use of their capacity towards sorbing ammonia and any VOC without undesirable loss of capacity towards carbon dioxide sorption.

The novel sorbents of this invention for sorbing ammonia and the volatile organic compound employ graphene-based nano-materials characterized by a high surface area. It should be appreciated that graphene comprises a 2-dimensional crystalline allotrope of carbon in which carbon atoms are densely packed in a regular array of $sp^2$-bonded, atomic scale hexagonal pattern. Graphene can be described as a one-atom thick layer or sheet of graphite, as disclosed by H. Schniepp et. al. in "Functionalized Single Graphene Sheets Derived from Splitting Graphite Oxide," The Journal of Physical Chemistry B, Vol. 110, 17, 2006, 8535-8539. Graphene functionalized with oxygen-bearing substituents is frequently referred to as "graphene oxide," which likewise comprises a 2-dimensional crystalline allotrope of carbon in which carbon atoms are densely packed in a regular array of $sp^2$-bonded, atomic scale hexagonal pattern. Graphene oxide, however, further comprises epoxy (/ᴼ\) and hydroxyl (—OH) groups (or substituents) bonded to the surface of the graphene sheet as well as carboxyl [—C(O)OH] and hydroxyl (—OH) groups bonded to the edges of the sheet.

Generally, the oxygen in graphene oxide occurs as a mixture of hydroxyl, epoxy, and carboxyl substituents and is present in a concentration greater than about 5 percent, preferably, greater than about 10 percent, by weight, based on the weight of the graphene oxide. Generally, the oxygen is present in a concentration less than about 50 percent, preferably, less than about 40 percent, by weight, based on the weight of the graphene oxide. Of these, the carboxyl functionality represents from 30 to 100 percent by weight of the total oxygen, depending upon how the graphene oxide is prepared. In the [N]- and [O]-functionalized graphene sorbent of this invention, a proportion of oxygen substituents converted to nitrogen-containing substituents is typically greater than 5 percent, preferably greater than about 15 percent, and more preferably, greater than about 25 percent, up to essentially 100 percent.

More specifically, the novel graphene-based sorbent for adsorbing ammonia comprises graphene oxide having supported thereon at least one compound selected from metal salts, metal oxides, and acids, each of which is capable of reversibly adsorbing ammonia. The phrase "supported thereon" is non-limiting, referring broadly to any method of bonding the at least one compound selected from metal salts, metal oxides, and acids to the graphene oxide, as well as referring to any resulting binding configuration including physisorption, chemisorption, ionic bonding, Van der Waals bonding, covalent bonding, complexing, and the like. Such metal salts are comprised of a positively-charged metallic cation and a negatively-charged anion. Non-limiting examples of suitable positively-charged metallic cations include at least one of the cations selected from the metals of Groups 1 and 2, and the first row of transition elements of Groups 3 through 12 of the Periodic Table of the Elements (International Union of Pure and Applied Chemistry, Nov. 28, 2016). As used herein, the Group 1 metals include lithium, sodium, potassium, rubidium, and cesium. The Group 2 metals include beryllium, magnesium, calcium, strontium, and barium. The first row transition elements of Groups 3 through 12 include scandium, titanium, vanadium, chromium, manganese, iron, cobalt, nickel, copper, and zinc. Preferred for purposes of this invention are the cations of lithium, magnesium, calcium, strontium, iron, copper, zinc, and mixtures thereof. The negatively-charged anion of the metal salt may be any common anion including at least one of a halide, sulfate, nitrate, or phosphate. In one embodiment, the anion is a halide selected from fluoride, chloride, bromide, iodide, and mixtures thereof. Accordingly, among suitable non-limiting embodiments, the metal salt capable of reversibly sorbing ammonia is selected from the group consisting of lithium chloride, magnesium chloride, calcium chloride, strontium fluoride, iron chloride, copper chloride, zinc chloride, and mixtures thereof.

Suitable metal oxides that are capable of reversibly sorbing ammonia are selected from the oxides of the metals of Groups 1 and 2, and the first row of transition elements of Groups 3 through 12 of the Periodic Table of the Elements (International Union of Pure and Applied Chemistry, Nov. 28, 2016), such elements as described hereinbefore. Preferred for purposes of this invention are the oxides of lithium, magnesium, calcium, strontium, iron, copper, zinc, and mixtures of such oxides. Suitable acids that reversibly sorb ammonia include, without limitation, hydrochloric acid, phosphoric acid, nitric acid, and sulfuric acid, with phosphoric acid being a preferred embodiment.

A general method of preparing the ammonia sorbent of this invention involves contacting graphene oxide with at least one of the aforementioned metal salts, metal oxides, acids, or mixture thereof capable of reversibly adsorbing ammonia, the contacting including any of impregnating, immersing, spraying, sonicating, complexing, or otherwise chemically reacting graphene oxide with one or more solutions or slurries containing the metal salt(s), oxides(s), acid(s), or mixture thereof. It should be appreciated that graphene oxide can be purchased (e.g., Angston Corp.), but can also be prepared by ultrasonicating graphite oxide, or alternatively prepared by oxidizing graphite with a mixture of strong oxidants, such as sulfuric acid and potassium permanganate, followed by rapid heating of the resultant oxidized graphite under an inert atmosphere. After contacting the graphene oxide with the metal salt(s), metal oxide(s), and/or acid(s), the resulting composite is dried under air, typically, at a temperature ranging from about 50° C. to about 120° C. Generally, the metal salt, metal oxide, acid or mixture thereof is loaded onto the graphene oxide in a total amount ranging from about 0.05 weight percent to about 40 weight percent, based on the weight of the graphene oxide.

The graphene-based sorbent for sorbing the volatile organic compound is prepared generally by contacting graphene oxide with an amine of the formula $NHR_2$, wherein each R is independently selected from the group consisting of hydrogen, $C_{1-7}$ alkyl, and $C_{1-7}$ aminoalkyl, the contacting occurring under process conditions sufficient to prepare the nitrogen and oxygen-functionalized graphene. In one embodiment, the amine is represented by formula $NHR_2$, wherein each R is independently selected from the group consisting of hydrogen, $C_{1-5}$ alkyl, and $C_{1-5}$ aminoalkyl; illustrative non-limiting examples of which include methylamine, ethylamine, propylamine, dimethylamine, diethylamine, and dipropylamine. In another embodiment, each R is hydrogen and the amine is ammonia, suitably provided in an aqueous solution as ammonium hydroxide. More specifically, graphene oxide is solubilized or suspended in a suitable solvent and reacted with the amine of the formula $NHR_2$ at a temperature sufficient to promote the appropriate substitution or thermochemical reaction of the amine with the oxygen functionalities on the graphene oxide. In one preferred synthesis, graphene oxide is reacted with aqueous ammonia (ammonium hydroxide) at a temperature ranging from about 20° C. to about 110° C. for a time ranging from about 5 hours to about 48 hours. The quantity of ammonium hydroxide employed is sufficient to convert at least 10 percent and up to 100 percent of the oxygen functionalities to nitrogen functionalities. In another embodiment an excess of ammonium hydroxide relative to oxygen functionalities is employed. Following the thermal treatment, the solution is filtered and the resulting nitrogen and oxygen-functionalized graphene is thoroughly washed with water, then dried at a temperature ranging from about 70° C. to 120° C. to obtain the solid nitrogen and oxygen-functionalized sorbent of this invention. Where the amine ($NHR_2$) is an alkylamine or alkyldiamine, a suitable solvent or diluent, such as water or $C_{1-3}$ alcohol, is employed; or the amine itself acts as the solvent; and the reaction conditions are closely similar to those mentioned above as a person skilled in the art will appreciate.

We believe, although such belief is theory and should not be limiting in any manner, that the amine ($NHR_2$) reacts with the hydroxyl and carboxyl substituents on the graphene oxide giving rise, respectively, to amine (—$NR_2$) and amide [—$C(O)NR_2$] functionalities bonded to the graphene. Additionally, the amine may react with the epoxy substituents on the graphene oxide giving rise to both hydroxyl (—OH) and amine (—$NR_2$) functionalities, although the epoxy substituents are considered to be less reactive than the hydroxyl and carboxyl substituents. Accordingly, the sorbent of this invention is believed to comprise graphene functionalized with a plurality of two types of substituents: (a) an oxygen-containing substituent selected from the group consisting of hydroxyl (—OH), epoxy (/$^O$\) and carboxyl [—C(O)OH], and mixtures thereof; and (b) a nitrogen-containing substituent selected from the group consisting of amine (—$NR_2$), amide [—$C(O)NR_2$], and mixtures thereof, wherein each R again is independently selected from hydrogen, $C_{1-7}$ alkyl, and $C_{1-7}$ aminoalkyl. It is however possible that the sorbent also comprises ionic bonded amine in the form of quaternary ammonium carboxylates represented by [—C(O)O$^{-+}$HNHR$_2$]. Note that even in the instance wherein all hydroxyl, carboxyl, and epoxy groups have reacted with amine, the sorbent product is likely to contain amine, amide, and hydroxyl groups providing for both nitrogen and oxygen-functionalization.

Generally, the graphene sorbents of this invention have a particle size correlating substantially to the particle size of the unmodified graphene oxide from which the sorbent is derived. Since the sorbent and the unmodified graphene oxide are both essentially two-dimensional materials, the thickness of the particles is significantly smaller than the width of the particles. In typical embodiments, the thickness of the sorbent particles ranges from about 1 nanometer (1 nm) to less than about 50 nm, as determined by transmission electron microscopy (TEM) or scanning electron microscopy (SEM). The width of the particles ranges from greater than about 100 nm, preferably, greater than about 200 nm, to less than about 10 microns (μm). Various conventional methods, such as ball-milling, sonication, and thermal annealing, can be employed to modify the size of the particles and/or to select a range of desired particle sizes. The sorbents of this invention generally exhibit a high surface area similar to the surface area of the graphene oxide starting material. A typical surface area ranges from about 50 m$^2$/g to about 1,000 m$^2$/g, and in one embodiment, between about 200 m$^2$/g and about 500 m$^2$/g.

The sorbents of this invention are provided to the adsorption processes in any of a variety of physical forms including but not limited to powders, pellets, extrudates, or alternatively, as a layer, laminate or coating coupled to a non-porous or macroporous support, such supports to include ceramic and metallic fibers, meshes, foams, and monoliths. The term "macroporous" refers to pores, channels, or void spaces having a critical diameter or dimension larger than about 0.5 micron (>0.5 μm), and preferably, larger than about 25 μm. In one embodiment, the sorbent is provided as a layer or a coating covering a support in the form of a non-porous wall. In another embodiment, the sorbent is provided as a layer or a coating covering a macroporous support in the form of pellets or extrudates. In another embodiment, the sorbent is applied to a high surface area support, such as a support having a surface area of at least about 100 m$^2$/g for the purpose of increasing access of the gaseous feedstream to the sorbent as well as decreasing pressure drop across the sorbent bed. In yet another embodiment, the sorbent further comprises a binder, which functions to impart an acceptable degree of cohesiveness and attrition resistance to the sorbent. Supports and binders for sorbents are found in the art.

In a preferred embodiment, the ammonia and VOC sorbents are each individually applied as a layer or coating to a high surface area mesh support, preferably, a Microlith® brand mesh support having an ultra-short-channel-length (Precision Combustion, Inc., North Haven, Conn.). The mesh support is in the form of a reticulated net or screen, that is, a substantially two-dimensional lattice wherein a thickness dimension is substantially smaller than length and width dimensions, and wherein the lattice contains a regular or irregular array of short pores and channels. In terms of materials of construction, the mesh support is selected from metal meshes, ceramic meshes, cermet meshes, and combinations thereof. The mesh is not limited by any method of manufacture; for example, meshes can be constructed via weaving or welding fibers, or by an expanded metal technique as disclosed in U.S. Pat. No. 6,156,444, incorporated herein by reference, or by 3-D printing, or by a lost polymer skeleton method.

In more specific embodiments, the metal mesh support is constructed from any thermally and electrically conductive metal or combination of such metals provided that the resulting structure is capable of withstanding the temperatures and chemical environment to which the mesh is exposed. Suitable non-limiting materials for the metal mesh support include iron-chromium alloys, iron-chromium-aluminum alloys, and iron-chromium-nickel alloys. Such metal meshes are available commercially, for example, from Alpha Aesar and Petro Wire & Steel. In one embodiment, the metal mesh comprises a Microlith® brand metal mesh obtainable from Precision Combustion, Inc., of North Haven, Conn., USA.

Pertaining to ceramic meshes, the term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of short channel ceramic mesh comprising woven silica, both patents incorporated herein by reference. Pertaining to cermet meshes, the term "cermet" refers to a composite material comprising a ceramic in combination with a metal, the composite being typically conductive while also exhibiting a high resistance to temperature, corrosion, and abrasion in a manner similar to ceramic materials.

More specifically, the mesh support is configured typically with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. Preferably, the mesh has a cell density ranging from about 100 to about 1,000 cells or flow paths per square centimeter.

As described in U.S. Pat. Nos. 5,051,241 and 6,156,444, incorporated herein by reference, Microlith® brand mesh technology offers a unique design combining an ultra-short-channel-length with low thermal mass in one monolith, which contrasts with prior art monoliths having substantially longer channel lengths as noted hereinabove. For the purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths greater than about 5 mm (0.20 inch) upwards of 127 mm (5 inches).

The loading of the graphene-based sorbent onto the mesh support is described in units of weight sorbent per unit volume of support; and this advantageously ranges in one embodiment from about 50 mg sorbent per cubic centimeter support (50 mg/cm$^3$) to about 1,500 mg/cm$^3$. In another embodiment, the loading ranges from about 100 mg/cm$^3$ to about 750 mg/cm$^3$. This description takes gross dimensions of the support into account. The thickness and uniformity of the sorbent coating on the support vary depending upon the specific support, sorbent, and coating method selected.

It should be appreciated that in one exemplary embodiment, the sorbent compositions of this invention exclude any microporous and mesoporous co-sorbent, including any co-sorbent carbon nanotube (CNT), zeolite, molecular sieve, activated carbon, or mixture thereof. Such co-sorbents typically contain a regular or irregular system of tubes, pores, channels, or void spaces having a critical dimension ranging from about 0.5 nanometer (0.5 nm) to about 50 nm, which we find undesirable for two reasons. Firstly, such microporous and mesoporous co-sorbents are limited to trapping only VOC's that fit within their tubular or pore system, that is, those VOC's with dimensions smaller than the dimensions of the tubes, pores, channels, or void spaces. Secondly, VOC's that enter the tubular or pore system may find it difficult to exit. As a consequence, regenerating microporous and mesoporous co-sorbents is difficult resulting in undesirable loss in sorbent capacity. Additionally, CNT's in particular are difficult to fabricate in large scale thereby adding unnecessary costs to manufacture. In contrast, our graphene-based sorbents are each prepared in one simple, cost effective step; are essentially non-porous (i.e., essentially do not contain pores and channels), and exhibit excellent regenerability.

In one embodiment, the process of removing ammonia from a gaseous stream is conducted in a single sorbent bed, wherein in adsorption mode a flow of gaseous feedstream containing ammonia in an initial concentration is contacted with a fixed bed of the ammonia sorbent for a time during which an effluent stream exiting the sorbent bed contains an acceptably reduced concentration of ammonia. When the ammonia sorbent bed is fully or partially saturated and the effluent stream contains an unacceptable concentration of ammonia (a condition known as "break-through"), the flow of gaseous feedstream containing ammonia is stopped. Thereafter, the sorbent is regenerated by running the bed in desorption mode by one or a combination of methods including: heating the sorbent bed, or exposing the sorbent to a pressure gradient, namely, a decreased pressure or vacuum; or passing a sweep gas through the sorbent bed to drive off the adsorbed ammonia, which is typically collected in a containment vessel or exhausted into an exterior atmosphere. Suitable sweep gases include air, nitrogen, carbon dioxide, helium, argon, and the like, with air being a preferred sweep gas; any of these being provided in "clean" form, that is, essentially absent absorbable contaminants. In a preferred embodiment, the ammonia sorbent bed is regenerated by exposing the bed to a pressure gradient, that is, a decreased pressure or a vacuum of less than about 1 Torr, at ambient temperature, taken as about 21-25° C., although it may vary depending on the ambient condition. Thereafter, the process involves alternating the sorbent bed between adsorption and desorption modes over many reiterations, pressure swing regeneration being preferred.

In terms of operation, in one embodiment, the second process of removing ammonia and a volatile organic compound from a gaseous feedstream is effected in a staged reactor wherein a first bed comprises the ammonia sorbent and a second bed comprises the formaldehyde sorbent; or vice versa as desired. In one embodiment, the first and second beds are provided within one housing. In another embodiment, the first and second beds are provided in separate housings. Preferably, the ammonia sorbent is disposed upstream of the VOC sorbent. In the aforementioned embodiments, the sorbents can be provided in powder form or provided on a support; in a preferred embodiment supported on the Microlith® brand mesh support described hereinbefore. In the latter embodiment, a plurality of mesh-supported sorbents are stacked either sequentially or in alternating layers or in any other desired configuration within one or more housings.

In adsorption mode for removing multiple contaminants, a flow of gaseous feedstream containing ammonia and VOC sorbates in their respective initial concentrations is contacted with the combined sorbent system so as to remove the ammonia and the VOC, until such time as one or both of the sorbates breaks through the effluent stream in an unacceptable concentration. At such time, the flow of gaseous feedstream to the sorbent bed(s) is stopped; and thereafter the sorbents are regenerated. Regeneration (or desorption mode) includes one or more of heating the sorbent beds, or decreasing pressure, e.g., pulling a vacuum on the sorbent beds, or passing a sweep gas through the sorbent beds, such that desorbed ammonia and the VOC are either collected in a containment vessel or exhausted into an exterior atmosphere. Suitable sweep gases include air, nitrogen, carbon dioxide, helium, argon, and the like, with air being a preferred sweep gas; notably, the sweep gas is "clean," essentially excluding absorbable contaminants. A preferred regeneration method involves exposing the sorbent system to a pressure gradient, for example, by pulling a vacuum ($\leq 1$ Torr) on the system at ambient temperature, taken as about 21-25° C., although it may vary depending on the ambient condition. Thereafter, the process involves alternating the sorbent system between adsorption and desorption modes over many iterations.

In another embodiment of the aforementioned processes, a plurality of sorbent beds is engaged in swing mode operation such that one or more sorbent beds are operated in adsorption mode, while one or more other sorbent beds are simultaneously operated in desorption mode. As the beds operating in adsorption mode reach a desired partial or full saturation, the bed operations are switched such that the bed(s) originally operating in adsorption mode are engaged in desorption mode, while the bed(s) originally operating in desorption mode are converted to adsorption mode. Temperature swing operation involves cycling the beds between a temperature suitable for effecting adsorption and a temperature, usually a higher temperature, suitable for effecting desorption. Pressure swing operation involves cycling the beds between a pressure gradient, for example, exposure to the VOC at normal or elevated pressure to effect adsorption and then exposure to a lower pressure, such as a vacuum, to effect desorption. Swing bed technology is known in the art and advantageous in eliminating downtime while a bed is regenerated.

Valves for directing the flow(s) into and out of each sorbent bed can be any of those commercially available flow control valves known to a person skilled in the art. Likewise, valves for exposing each sorbent bed to a pressure gradient include any of such pressure control valves that are known to a skilled person and generally available commercially. The term "pressure gradient" means that the pressure control valve connects two environments at different pressures; for example, the pressure of the contaminant in the sorbent bed when the bed is loaded is typically higher than the pressure of the contaminant in an environment outside the sorbent bed. Sensors detecting a concentration of the contaminant in each sorbent bed or in an effluent stream exiting each sorbent bed can be any commercially available sensor suitable for detecting the contaminant of interest. Such sensors include, for example, flame ionization detectors and thermal conductivity detectors. Finally, a controller responsive to the sensor(s) or a predetermined time period for controlling operation of the plurality of valves can be obtained commercially or constructed by a person skilled in the art.

The adsorption-desorption processes of this invention are conducted under any process conditions providing for acceptable reduction of ammonia or reduction of ammonia and volatile organic compound, preferably formaldehyde, from the gaseous feedstream. The following process conditions are presented for guidance purposes; however, other process conditions may be operable and desirable. The ammonia or the ammonia-VOC (e.g., formaldehyde) adsorption cycle is operated advantageously at a sorbent bed temperature ranging from about 5° C. to about 50° C. and a pressure ranging from about 1 atm (101 kPa) to about 5 atm (506 kPa). In one exemplary embodiment, the adsorption cycle is operated at about ambient temperature and pressure, taken as 21-25° C. and about 1 atm (101 kPa). Advantageously, during the adsorption cycle the gaseous feedstream containing ammonia or containing ammonia and VOC (formaldehyde) is fed to the sorbent bed at a gas hourly space velocity ranging from about 100 ml total gas flow per ml sorbent bed per hour ($hr^{-1}$) to about 100,000 $hr^{-1}$. The desorption cycle is beneficially operated by simply exposing the partially saturated sorbent(s) to a lower pressure at a temperature less than about 40° C., in one embodiment from about 21° C. to about 35° C., and preferably at ambient temperature, taken as 21° C.-25° C. Advantageously, the desorption cycle operates at a total pressure ranging from about 0.0002 atm (0.02 kPa) to about 1 atm (101 kPa).

In adsorption mode, the first process of this invention achieves a lower concentration of ammonia in the effluent stream exiting the sorbent bed, as compared with the initial concentration of ammonia in the feedstream to the bed. In adsorption mode, the second process of this invention achieves lower concentrations of ammonia and the volatile organic compound in the effluent stream exiting the sorbent bed, as compared with the initial concentrations of ammonia and volatile organic compound fed to the bed. Generally for spacesuit and aerospace applications the concentration of ammonia in the effluent stream is advantageously less than about 20 $ppm_v$, more preferably, less than about 10 $ppm_v$, based on the total volume of the effluent stream exiting the adsorption bed. Generally, for spacesuit and aerospace applications, the concentration of formaldehyde in the effluent stream is advantageously less than about 0.6 $ppm_v$, preferably, less than about 0.2 $ppm_v$, based on the total volume of the effluent stream exiting the adsorption bed.

One property of the sorbents of this invention should be fully appreciated as distinct from sorbents known in the art. Specifically, the sorbents of this invention are capable of regeneration under mild conditions, which means that when the sorbents are fully or partially saturated with sorbate(s), their adsorption capacity is regenerable under a reduced pressure or vacuum, or under a flow of a sweep gas, such as essentially clean air, at a temperature less than about 40° C., in one embodiment less than about 35° C., and at about 1 atm (101 kPa). This allows for the sorbents of this invention to be regenerated without application of significant heat and therefore with low power consumption. We have further discovered that our sorbents can be cycled through at least about 3 adsorption-desorption cycles without losing more than 20 percent of their original capacity for sorbent.

EMBODIMENTS

Example 1 (E-1)

An embodiment of the ammonia sorbent of this invention was prepared and evaluated in removing ammonia from a gaseous environment. A rig for adsorption and desorption testing was constructed as follows. A single fixed sorbent bed comprising a cylindrical tube [stainless steel, 0.8 inch inner dia. (2.0 cm), 0.5 inch length (1.25 cm)] was fitted at each end with a flow line and a conventional flow control valve, on the upstream end for controlling a flow of gaseous feedstream into the bed and on the downstream end for exiting an effluent flow from the bed. The tube was provided with a voltage controller and wrapped with a heating tape so as to provide heating to the bed. A humidity control was connected to the upstream flow line to provide gaseous water to the feedstream. A commercial supply of ammonia in air (Airgas) was diluted with a supplemental supply of clean air (compressed air absent contaminants) to yield the gaseous feedstream of desired $NH_3$ contaminant concentration. Water was fed into the supplemental supply of air to bring the feedstream humidity to a desired level, as measured by a relative humidity detector (HMC 20, Vaisala). The concentration of ammonia in the effluent stream was analyzed by passing the effluent stream through a conventional catalytic oxidizer, which converted any ammonia in the effluent stream into nitrogen oxides (NOx), which in turn were analyzed in a chemiluminescence detector (Thermo Scientific).

A sorbent comprising graphene oxide having supported thereon calcium chloride was prepared as follows. A solution of calcium chloride (100 mg $CaCl_2$ in 100 ml deionized water) was added drop-wise onto a sample of graphene oxide (1 g, Angstron Materials, catalog number N002-PDE, graphene oxide platelets with a thickness of 2-3 nanometers (2-3 nm); lateral dimension of approximately 7 micrometers (7 μm); carbon content 60-80 percent; oxygen content between 10-30 percent; and a surface area of 420 $m^2$/gm.). The resulting $CaCl_2$-impregnated material was dried at 80° C. to yield the ammonia sorbent as a powder.

Operating conditions during adsorption mode were as follows: sorbent bed (900 mg); feedstream inlet pressure, 2-3 psig (14-21 kPa); temperature, 22° C.; flow rate, 1 standard liter per minute (1 slpm) contaminated air containing ammonia (20 $ppm_v$); relative humidity, 20 percent. Break-through was defined as the time at which the concentration of ammonia in the effluent stream equaled 50 percent of the inlet ammonia concentration, namely, 10 $ppm_v$.

Results are shown in FIG. 1, where breakthrough in the first cycle was seen at 200 minutes. The sorbent bed was thereafter subjected to desorption by exposing the bed to a stream of clean dry air at ambient temperature, that is, without heat input. Then the bed was subjected to a second adsorption cycle with the same ammonia-contaminated air. Results are shown in FIG. 1, wherein breakthrough for the second adsorption cycle was seen at 180 minutes. Thereafter, the bed was subjected to a second desorption cycle under clean, dry air at room temperature without heat input. Then, the bed was subjected to a third adsorption cycle with the same stream of ammonia-contaminated air. Results are shown in FIG. 1, wherein breakthrough for the third adsorption cycle was found at 190 minutes. The data show consistency in the $NH_3$ outlet concentration over all three adsorption cycles, which indicates good sorption capacity and excellent regenerability under mild conditions. The sorbent achieved an overall average cyclic capacity of 2.8 mg $NH_3$/g sorbent.

Example 2 (E-2)

An embodiment of this invention comprising the ammonia sorbent supported on a metal mesh support was prepared and evaluated in the removal of ammonia from a gas environment. A sorbent comprising graphene oxide having supported thereon calcium chloride was prepared in the manner described in Example 1. The sorbent was applied with a binder to a Microlith®-brand ultra-short-channellength metal mesh (Precision Combustion, Inc.) having a channel length of 250 microns.

Figure 2:
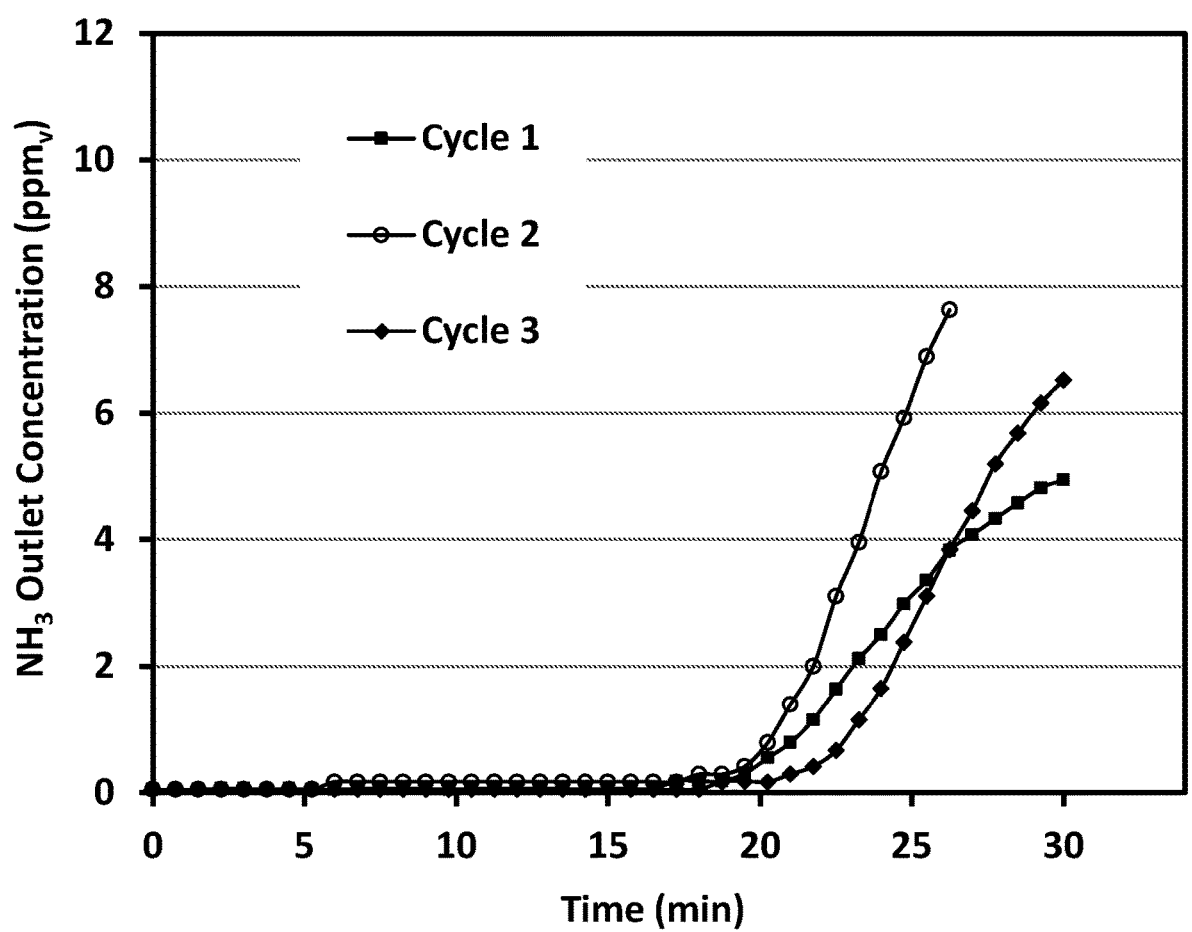
FIG. 2 illustrates a graph plotting ammonia outlet concentration as a function of time in an embodiment of this invention in which ammonia is removed from a gaseous feedstream using the ammonia sorbent supported on a metal mesh.

The metal mesh (100 sheets) supporting the ammonia sorbent was placed in a cylindrical fixed bed test rig (2.0 cm inner dia., 0.8 inch), otherwise constructed as in Example E-1. The mesh-supported sorbent was evaluated for ammonia sorption capacity in a manner similar to E-1. Operating conditions during adsorption mode were as follows: inlet pressure of the feedstream to the sorbent bed, 2 Pa gage pressure (101.35 kPa absolute); temperature of the sorbent bed, ambient (22° C.); flow rate, 1 slpm contaminated air containing ammonia (20 $ppm_v$); relative humidity, 20 percent. Break-through was taken at 5 $ppm_v$ ammonia in the outlet stream, at which time adsorption was stopped. The pressure drop measured across the metal mesh sorbent bed was less than 25 Pa, which was significantly lower than that measured across the powder bed of Example E-1. Regeneration was conducted under vacuum (300 mTorr, 40 Pa absolute) without application of heat. The bed was subjected to a total of three adsorption cycles with intervening desorption cycles with the results shown in FIG. 2. As observed, full ammonia sorption was observed for 18 minutes in each cycle with successful regenerability. The bed was subjected to 17 additional adsorption cycles with intervening desorption cycles with no observable deterioration in sorbent capacity or regeneration capability.

Example 3 (E-3)

An embodiment of the process and sorbent system of this invention was evaluated in removing ammonia and formaldehyde from air containing these trace contaminants. The experimental setup of Example E-2 was employed, with the exception that the sorbent bed consisted of a combination of the graphene-based ammonia sorbent of Example E-2 and the functionalized graphene-based formaldehyde sorbent of this invention, each supported independently on the Microlith®-brand metal mesh employed in Example 2. The ammonia sorbent was placed upstream of the formaldehyde sorbent in the test rig.

The formaldehyde sorbent (240 mg) comprising the nitrogen and oxygen-functionalized graphene was prepared by thermal treating a commercial graphene oxide with aqueous ammonium hydroxide. The graphene oxide in powder form (Angstron Materials, catalog number N002-PDE) comprised a few-layer graphene oxide platelets with a thickness of 2-3 nanometers (2-3 nm); a lateral dimension of approximately 7 micrometers (7 μm); a carbon content of 60-80 percent; oxygen content between 10-30 percent; and a surface area of 420 $m^2/gm$. The powder was mixed in a flask with excess aqueous ammonium hydroxide (30 wt. percent solution) in a ratio of 30 g ammonium hydroxide solution per gram graphene oxide. The mixture was heated to 90-100° C. under reflux for 48 h. Periodically, the level of the mixture was checked and replenished as needed, as some ammonia gas was released from solution under reaction conditions. At the end of the 48 h a solid product was recovered by filtration and washed with deionized water until the pH of the filtrate was measured at neutral. The solid was further dried at 70° C. overnight to yield the formaldehyde sorbent as a powder. The sorbent was applied with a binder to the Microlith®-brand metal mesh (Precision Combustion, Inc.) of Example 2 yielding the mesh-supported formaldehyde sorbent of this invention.

The two graphene-based sorbents were positioned within the cylindrical fixed bed, the ammonia sorbent (85 weight percent) placed upstream of the formaldehyde sorbent (15 weight percent). The combination sorbent bed was exposed to a feedstream comprising ammonia (20 $ppm_v$) and formaldehyde (5 $ppm_v$), a relative humidity of 20 percent, balance being air. Total flow through the composite sorbent bed was 1 slpm at 22° C. and 1 atm (101 kPa). Regeneration was performed by applying a vacuum at ambient temperature (22° C.) without added heat. Four adsorption cycles were run, with three intervening desorption cycles.

Figure 3:
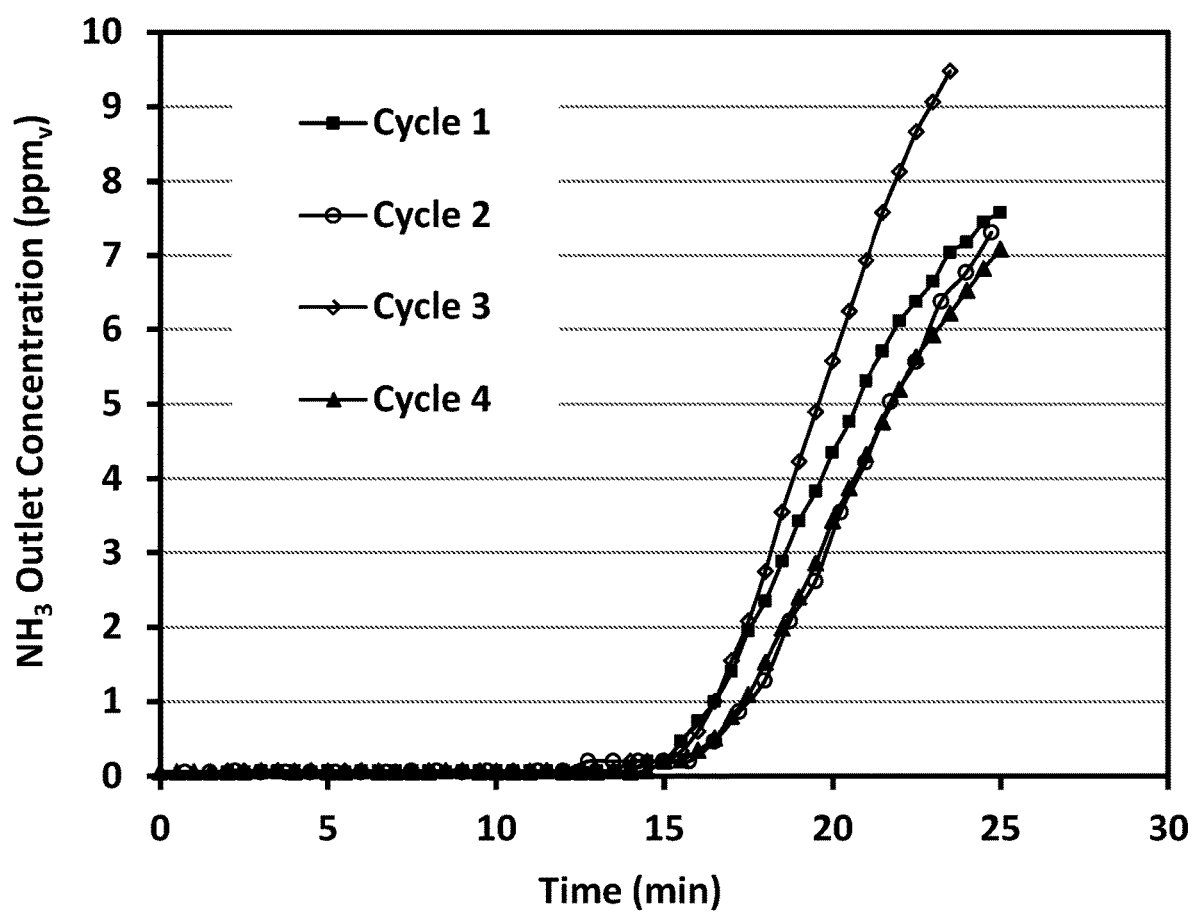
FIG. 3 illustrates a graph plotting ammonia outlet concentration as a function of time in an embodiment of this invention in which ammonia and formaldehyde are removed from a gaseous feedstream using the dual graphene-based sorbent system of this invention.

FIG. 3 depicts a graph of ammonia sorption in the outlet stream of the process as a function of time. Throughout the test, the outlet concentration of formaldehyde was measured at less than 0.1 $ppm_v$. All four adsorption cycles showed consistent profiles. Full ammonia removal was achieved for about 15 minutes in each run, while formaldehyde was fully removed throughout the tests. The pressure drop across the sorbent bed was measured at less than 25 Pa. The results demonstrate efficient removal of ammonia and formaldehyde with proven vacuum (pressure swing) regenerability.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A process of removing ammonia from a gaseous environment, comprising contacting a gaseous feedstream comprising an initial concentration of ammonia with a sorbent under adsorption conditions sufficient to produce an effluent stream comprising a reduced concentration of ammonia as compared with the initial concentration; wherein the sorbent comprises graphene oxide having supported thereon at least one compound selected from metal salts, metal oxides, and acids, each of which is capable of reversibly adsorbing ammonia.

2. The process of claim 1 wherein the gaseous feedstream comprises from greater than 0.1 $ppm_v$ to less than 10,000 $ppm_v$ ammonia.

3. The process of claim 1 wherein the metal of the metal salts and metal oxides is selected from cations of Groups 1, 2, and the first row transition metals of Groups 3 through 12 of the Periodic Table, and mixtures thereof; and wherein the acids are selected from hydrochloric sulfuric, nitric, and phosphoric acids.

4. The process of claim 1 wherein the metal of the metal salts and metal oxides is selected from cations of lithium, magnesium, calcium, strontium, iron, copper, zinc, and mixtures thereof; and further wherein the metal salt comprises a halide anion selected from fluoride, chloride, iodide, bromide, and mixtures thereof.

5. The process of claim 1 wherein the sorbent is supported on a mesh support selected from metal, ceramic, and cermet meshes having an ultra-short-channel-length ranging from 25 microns to 500 microns.

6. The process of claim 1 wherein the contacting is conducted at a temperature ranging from 5° C. to 50° C., a pressure ranging from 1 atm (101 kPa) to 5 atm (506 kPa), and a gas hourly space velocity ranging from 100 ml ammonia per ml sorbent per hour ($hr^{-1}$) to 100,000 $hr^{-1}$.

7. The process of claim 1 wherein after the sorbent is saturated or partially saturated with ammonia, the process further comprises a step of regenerating the sorbent by desorbing the ammonia; and thereafter the steps of adsorption and regeneration are reiterated at least once.

8. The process of claim 7 wherein the regeneration of the sorbent is effected by exposing the partially or fully saturated sorbent to a pressure gradient or a flow of sweep gas, at a temperature less than 40° C.

9. The process of claim 1 wherein the contacting is conducted in a single sorbent bed or is conducted in a plurality of sorbent beds operating in swing mode.

10. A process of removing ammonia and a volatile organic compound from a gaseous environment, comprising contacting a gaseous feedstream comprising an initial concentration of ammonia and an initial concentration of the organic compound with a sorbent system under conditions sufficient to produce an effluent stream comprising reduced concentrations of ammonia and the organic compound as compared with their respective initial concentrations; the sorbent system comprising:
(a) graphene oxide sorbent having supported thereon at least one compound selected from metal salts, metal oxides and acids, each of which is capable of reversibly adsorbing ammonia; and
(b) a nitrogen and oxygen-functionalized graphene sorbent prepared by a process comprising, contacting graphene oxide with an amine of the formula $NHR_2$, wherein each R is independently selected from the group consisting of hydrogen, $C_{1-7}$ alkyl, and $C_{1-7}$ aminoalkyl, the contacting occurring under reaction conditions sufficient to produce the nitrogen and oxygen-functionalized graphene sorbent.

11. The process of claim 10 wherein the gaseous feedstream comprises from greater than 0.1 $ppm_v$ to less than 10,000 $ppm_v$ ammonia and from greater than 0.1 $ppm_v$ to less than 10,000 $ppm_v$ of the volatile organic compound.

12. The process of claim 11 wherein the volatile organic compound has a dipole moment greater than 0.8 D and less than 15 D.

13. The process of claim 10 wherein the gaseous feedstream comprises ammonia in a concentration from about 10 $ppm_v$ to about 100 $ppm_v$ and formaldehyde in a concentration from about 0.1 $ppm_v$ to about 10 $ppm_v$.

14. The process of claim 10 wherein the metal of the metal salts and metal oxides is selected from cations of Groups 1, 2, and the first row transition metals of Groups 3 through 12 of the Periodic Table, and mixtures thereof; and wherein the acids are selected from hydrochloric, phosphoric, nitric, and sulfuric acids.

15. The process of claim 10 wherein the metal of the metal salts and metal oxides is selected from lithium, magnesium, calcium, strontium, iron, copper, zinc, and mixtures thereof; and further wherein the metal salt comprises an anion selected from fluoride, chloride, bromide, iodide, and mixtures thereof.

16. The process of claim 10 wherein the sorbents (a) and (b) are each supported on a mesh support selected from metal, ceramic, and cermet meshes having an ultra-short-channel-length ranging from 25 mm to 500 mm.

17. The process of claim 10 wherein the contacting is conducted at a temperature ranging from 5° C. to 50° C., a pressure ranging from 1 atm (101 kPa) to 5 atm (506 kPa), and a gas hourly space velocity ranging from 100 ml total flow per ml sorbent per hour ($hr^{-1}$) to 100,000 $hr^{-1}$.

18. The process of claim 10 wherein after one or both of the sorbents are partially or fully saturated with sorbates, the process further comprises a step of regenerating the sorbents; and thereafter the steps of adsorption and regeneration are reiterated at least once.

19. The process of claim 18 wherein the regeneration is effected by exposing the partially or fully saturated sorbents to a pressure gradient or a flow of sweep gas, at a temperature less than 40° C.

* * * * *